Patented May 20, 1924.

1,494,439

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF MAKING RECONSTRUCTED MILK OR CREAM.

No Drawing.  Application filed August 16, 1923.  Serial No. 657,823.

*To all whom it may concern:*

Be it known that I, CHARLES E. NORTH, a citizen of the United States of America, residing at Montclair, in the county of Essex and State of New Jersey, have invented certain new and useful Improvements in Processes of Making Reconstructed Milk or Cream, of which the following is a full, clear, and exact description.

In very recent years there have been developed in the milk industry processes for manufacturing dried or dehydrated milk in the form of powder. The presence of fat in this product is recognized as an obstacle to its commercial success, as such fat develops tallowy flavors and rancidity, with the result that the manufacture of milk powders without fat is carried out to a much greater extent than that of such dried milk containing fat.

Dried skim milk is practically imperishable and procurable in the market in any quantity, and this has created a demand on the part of users and consumers for facilities for adding fat in order to produce a product approximating natural whole milk or cream. Machines have, therefore, been developed which are variously known as homogenizers, emulsors, creamers or viscolizers, the function of which is to break up the fat mechanically into globules of varying degrees of fineness in the presence of a solution of such powders.

The fat used for this purpose is, generally, butter, although milk fat may have been used, and the production of an emulsion of such fat with water and dried milk is comparatively new and practiced chiefly by makers of ice cream, more rarely by dealers in fluid milk and cream, for reconstructed milk and cream made in this way has not heretofore proved to be a commercial success. This is mainly due to the inferior qualities of the fat in the form of butter, all of which is subject to decomposition because of the presence in it of water, casein and other food for bacteria; to the insoluble character of practically all available dried skim milk which lessens its value as an emulsifying agent; to the cooked taste which milk powder generally possesses and which impairs the flavor of the reconstructed milk, and to the inability heretofore existing to produce a stable emulsion or one in which the fat will not separate out in a comparatively short time.

Another and a much more important reason for the failure to produce good emulsions in the milk industry is to be found in the unscientific methods pursued in the process of emulsification. For illustration, the steps habitually followed in the industry for making a reconstructed cream with a fat percentage of 40, are as follows:—(*a*) To make 100 lbs. of cream, 40 lbs. of fat, 5 lbs. of skim milk powder and 55 lbs. of water are weighed out; (*b*) all these are then placed in a suitable tank where the temperature is maintained at a point sufficient to melt the fat and thoroughly mixed, but since water and oil refuse to mix, the discharge from such tank is rough and uneven and varies greatly in the percentages of the ingredients; (*c*) the mixture from the tank is passed through an emulsifying machine by which the fat is broken up into globules of a size depending upon the type of machine used. A homogenizer, for example, is a machine for producing the finest globules, much finer, in fact, than those which exist in natural cream, and by its use an emulsion is produced which is stable, or permanent, but it is objectionable because the cream "feathers" or rises in suds when used with coffee, and does not rise to form a sharp "cream line" when mixed with milk.

On the other hand, such machines as emulsors, creamers or viscolizers, which produce globules of the size of those in natural cream, deliver emulsions which are unstable, and from which in a comparatively short period the fat separates and rises to the surface as a hard plug of butter when cold or a layer of oil when warm.

I have now found that my belief was correct that the whole practice in the milk industry in this regard violated the fundamental principles underlying the proper making of emulsions. In an emulsion of a fat or oil there are three elements, viz, fat, water and an emulsifying agent, the latter being the vital factor in producing a fixed or stable emulsion. In the case of milk or cream this agent is casein, while in the case of other emulsions it may be a gum or a gummy material such as gelatine, agar or the like. When water in the right quantity is added to such agents it is absorbed, the material swells up going into partial solution or suspension and becomes what is known as a colloid. Casein, for this reason, exists in natural milk or cream in a colloidal form, and in this form it is one of the best emulsifying agents, and persistently tends to hold the fat globules in an emulsified condition.

In the formation of an emulsion of milk or butter fat with casein or with skim milk powder which carries a relatively large proportion of casein, and which is used as the emulsifying agent, success depends, therefore, upon the manner in which the three elements are brought into contact with each other. Stability depends, primarily, upon direct and intimate contact between the fat and the casein, and just as water will tend to break up the natural emulsion of milk or cream, so the presence of water between the fat and the casein prevents such contact and tends to destroy stability.

The proper intimate contact between fat and casein may only be secured by mixing the two together in the presence of as little water as possible, and in the use of skim milk powder as the emulsifying agent only such amount of water should be used as will dissolve the powder into a gummy or colloidal condition. By its mixture in this condition with milk fat the latter is readily formed into a stable emulsion. If, however, free water or that not taken up by the casein or the fat is present, no such intimate contact is possible. The milk industry, therefore in attempting to emulsify the fat, casein and all of the water which the product is assumed to contain has failed because it violated the basic principles underlying the forming of emulsions.

In producing reconstructed milk or cream from milk fat and casein or skim milk powders, I proceed as follows: Assuming 100 lbs. of 40% cream is to be produced, I weigh out 40 lbs. of milk fat, 5 lbs. of skim milk powder without fat and 55 lbs. of water. To the solids not fat I add only 3 lbs. of water gradually, and the two ingredients are thoroughly mixed in any known manner until a smooth, uniform and stiff paste results. This paste is then mixed with the 40 lbs. of milk fat gradually, a further quantity of water being added at such a rate during continuous mixing that the paste always appears as a stiff and smooth composition, with no free water and no free oil. It is my belief that it is the stiffness of the paste which in the mixing action creates a friction which tears the oil into fine particles and at the same time brings those particles into intimate contact with the emulsifying agent and forms a permanent emulsion. Too much water dilutes the paste and by making it too thin destroys the friction required to emulsify the fat. Too little water, on the other hand, fails to keep the skim milk solids and particularly the casein in the colloidal or soluble form necessary for its efficient operation as an emulsifying agent.

The milk fat or oil is practically free from moisture and is itself hydroscopic, hence when associated with the paste it absorbs water therefrom. As successive amounts of fat are added, therefore, free oil will appear in the mixture and this cannot be emulsified until sufficient water is added to supply all that absorbed by the hydroscopic properties of the fat, and to maintain the solids not fat in proper solution or colloidal form. In my experimental investigation of this process I have found that amount of water to be, by weight, a little more than one-half the weight of such solids, and about one-eighth of the total weight of the fat. In other words, the hydroscopic requirements of the fat itself amount to about one-eighth of its total weight, and the water required to make a suitable paste of the powder, is little more than one-half its weight.

Whenever this process is properly carried out the additions of fat and water during the mixing will keep the composition in the form of a stiff paste having a consistency approximately that of bread dough with a smooth and glistening appearance like mayonnaise or custard. When all the fat has been added, there should be no free water and no free oil present, but the fat should be completely emulsified. The total weight of the paste will be 53 lbs.

To make the 100 lbs. of cream from this product 47 lbs. of water are added. The paste is completely soluble and nothing but simple stirring with the remaining water is required to produce the finished cream. In short the emulsion is produced with 8 lbs. or only 1/7th of the total water, the remaining 6/7th being reserved to dilute the completed paste.

In case I desire to make milk containing 4% fat, I should first make a paste by mixing for each 100 lbs. of milk, 8½ lbs. of dry skim milk powder with 4 lbs. of water adding gradually 4 lbs. of fat and an additional ½ lb. of water until a firm smooth paste is obtained, or in other words I should use only 1/17th of the total amount of water to form the emulsion and add the balance after the paste is made.

In the home the housewife to make one quart of 40% cream would use 2/3rd of a cup of dry milk powder, and 1/4th of a cup of water to make a paste. To this she would add 2 cups of milk oil and an additional 1/4th of a cup of water and mix until the fat is all emulsified. The paste would amount to slightly less than one pint of material, and to this enough water would be added to make up one quart of cream.

The fact may be emphasized that the paste containing the oil is completely soluble in water. While water tends to break the emulsion and for this reason interferes with its production, nevertheless when the emulsion is once formed the addition of such amounts of water as are necessary to form the milk or cream has no such effect, so persistently does the casein adhere to the fat globules.

The mixing of water with the paste may be carried out on a large scale and under commercial conditions by any known devices or methods for such purposes. The most thorough mixing is obtained by passing the dissolved paste through an emulsifying machine as this insures the elimination of all lumps and adds to the uniformity of the size of the fat globules.

The paste made as above set forth is itself a new and highly useful commercial product. When properly made it is glairy or glistening and when stirred or worked snaps or cracks, and in such condition it may be sold directly as a substitue for condensed milk, particularly useful as a basis for ice cream, "mixes" and is the only material which renders possible the production of a stable or fixed emulsion of milk or butter fat with water and dried milk, or casein as the emulsifying agent. It is the only material known to me by which a reconstructed milk having all the properties of the natural product may be produced under commercial conditions that will not separate to form a cake of floating fat or a layer of oil.

What I claim is:

1. In the process of producing reconstructed milk or cream, the step which consists in forming a paste by mixing together dried milk solids not fat, water and milk or butter fat.

2. The new article of manufacture composed of an emulsion of milk or butter fat, with milk solids not fat as the emulsifying agent and with only sufficient moisture to insure the efficient action of the emulsifying agent.

3. The process of making reconstructed milk or cream, which consists in producing a paste of dried milk solids not fat, water and milk or butter fat and emulsifying the fat with the other ingredients by the friction resulting from mixing the same.

4. The process of making reconstructed milk or cream, which consists in producing a paste by mixing together dried milk solids not fat, water and milk or butter fat, and passing a solution of such paste through an emulsifying machine.

5. The process of making reconstructed milk or cream, which consists in producing a paste by mixing together dried milk solids not fat, milk or butter fat and only such amount of moisture as will insure complete emulsification of the fat, and then dissolving such paste with such proportion of water as would be present in natural milk or cream.

In testimony whereof I hereto affix my signature.

CHARLES E. NORTH.